Feb. 28, 1939.  W. P. LOWTHER  2,148,825
GRASS RECEIVER
Filed June 28, 1937
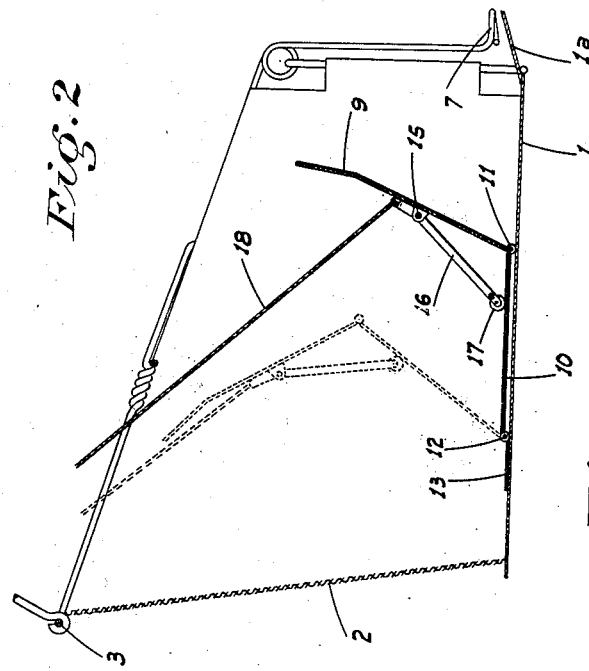
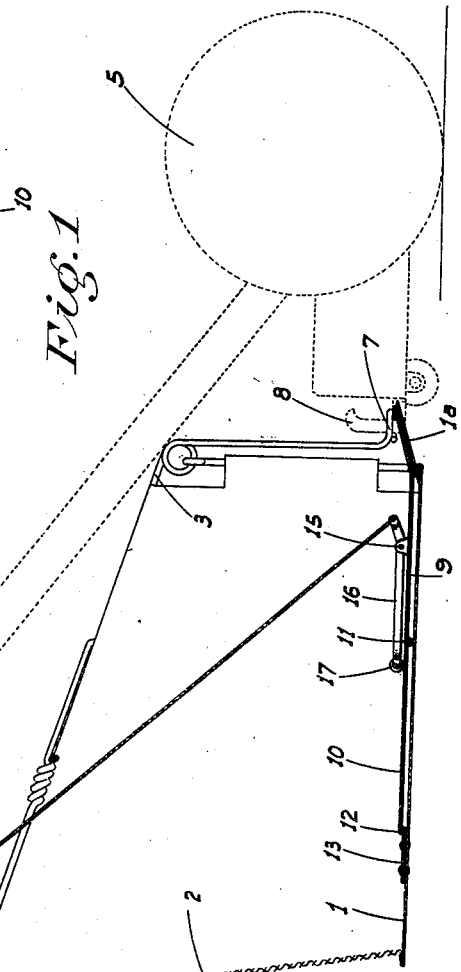
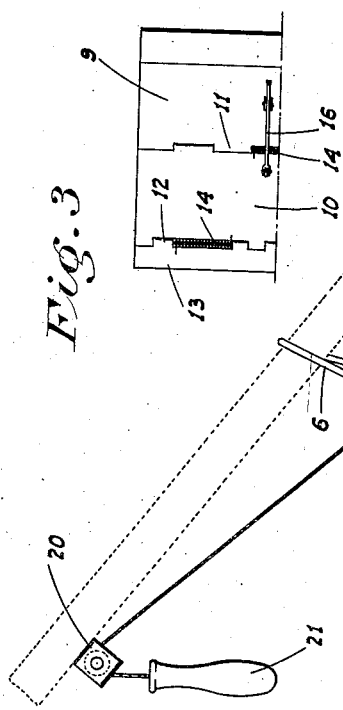
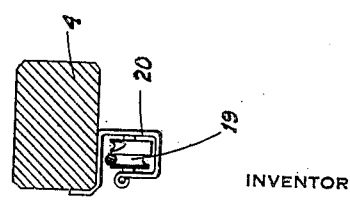
INVENTOR
*Wm. P. Lowther*
BY
ATTORNEY Patented Feb. 28, 1939

2,148,825

UNITED STATES PATENT OFFICE 2,148,825

GRASS RECEIVER

William P. Lowther, Merced, Calif.

Application June 28, 1937, Serial No. 150,744

4 Claims. (Cl. 56—200)

This invention relates to grass catching receivers such as are removably mounted on hand lawn mowers.

As such receivers are at present constructed the cut grass tends to pile up at the front of the receiver and to spill over at that end before the receiver is actually filled, and the operator must stop ever so often and shift the grass toward the back of the receiver by hand. This is an inconvenient operation and interferes with speedy cutting operations.

The principal object of my invention is to avoid this present inconvenient practice by constructing the receiver so that without stooping over or engaging the grass with the hands, any grass piling up at the front of the receiver may be moved toward the back of the same in a very quick and efficient manner. The device is also arranged so that a much greater load may be retained without spilling in a receiver of given capacity than is at present possible.

A further object of the invention is to produce a simple and expensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a sectional outline of a conventional grass receiver as attached to a lawn mower, showing my improved feature incorporated in the receiver.

Figure 2 is a similar view of the receiver detached and with the improved false bottom raised to throw the grass toward the back of the receiver.

Figure 3 is a fragmentary plan view of the false bottom detached.

Figure 4 is an end view of the cord locking device as mounted on the handle of a lawn mower.

Referring now more particularly to the characters of reference on the drawing, the receiver itself is of standard form and comprises a sheet metal bottom 1, and a body 2 of canvas extending upwardly from the sides and back of the bottom and which is supported about its top by a wire frame 3. At its rear end this frame is removably suspended from the handle 4 of a lawn mower 5 by a hook 6, and at its forward end the frame is formed with eyes 7 to removably engage the clips 8 secured as usual on the sides of the mower adjacent the level of the gauge roller thereof. The above construction is standard and I do not disturb the same in any way.

My improvement is applicable to or adapted to be incorporated in a receiver of this type and comprises a false bottom consisting of front and rear sections 9 and 10 respectively, slightly narrower than the main bottom 1 so that they can move upwardly between the canvas sides when the latter are relatively taut. The section 9 at its front end overhangs and conforms to the slope of the roller engaging apron 1a of the bottom 1 and at its rear end is hinged onto the adjacent end of the rear section 10 as at 11.

The rear section 10 is hinged at its rear end as at 12 onto a cross strip 13 rigidly secured to the bottom 1, adjacent its back end in any suitable manner. Torsion springs 14 are associated with the hinges and resist upward turning of the sections 9 and 10 on said hinges. The rear hinge 12 has preferably two springs and the front hinge 11 one spring, so that the rear section has a greater resistance to upward turning movement than the front section.

Pivotally mounted intermediate its ends on the front section 9 intermediate its ends and centrally of the width thereof as at 15 is a longitudinally extending arm 16, whose rearward end portion overhangs the back end of the rear section 10 and carries a roller 17 riding thereon. The other or forward end portion of this arm ahead of the pivot is relatively short and when the bottom sections are alined is disposed at an acuate upward angle thereto as shown in Fig. 1. A pull cord 18 is attached to the forward end of the arm and extends upwardly and rearwardly of the receiver and about a locking pulley 19 of conventional character or other suitable locking device, which is mounted in a bracket 20 mounted on the underside of the handle 4. This pulley is preferably of the spiral groove type such as has long been used in connection with pull-up window shades and the like, though it may be of the type shown for instance in Patent No. 210,902, dated December 17, 1878. The bracket is open on one side to receive the cord above the pulley so that said cord may be removably engaged over the pulley, the cord terminating in a pull handle 21.

In operation the false bottom initially lies flat on the main bottom and as the mower advances the cut grass falls onto the false bottom. When the grass piles up on the forward bottom section the cord is pulled so as to raise said section toward a vertical position as shown in Fig. 2. This causes the grass to be thrown toward the back of the receiver, and the forward bottom section is now clear of grass and may be again lowered to receive more grass. The above operation may be repeated as desired until the receiver is substantially loaded throughout its area with the light unpacked grass. The cord is then again pulled raising the forward section until the forward portion of the arm 16 flatly engages the bottom section 9 as shown in Fig. 2. The arm rearwardly of its pivot is then disposed at an angle to both bottom sections, and since the roller 17 is in constant contact with the rear section 10 the arm serves as a stop and maintains the angular relation of the sections with further pull on the cord.

Such further pull on the cord raises both bottom sections as a unit, causing them to both assume a relatively vertical position and confining and compressing the entire load of grass in the rear of the receiver, the cord being then locked to hold the bottom sections in such position. This leaves the main bottom 1 of the receiver exposed, and another load of grass may be deposited on the same with the further operation of the mower.

The springs of course act to return the bottom sections to their normal alined or horizontal position and the use of more of the stronger springs on the rear section than on the front section, prevents both sections from being raised with the initial pull on the cord, or until said sections are in position to raise as a unit as above described. The cord removably engaging the cord locking device, it may be easily disengaged therefrom whenever it is desired to remove the receiver from association with the mower when discharged of the load.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a grass receiver having a main bottom, a false bottom therein extending rearwardly from the front end of the main bottom, said false bottom comprising front and rear sections, means hinging the sections together at adjacent ends, means hingedly connecting the rear section at its rear end to the main bottom, means applied to the front section to pull the same upwardly about its hinge means, means mounted in connection with and acting on the front section to yieldably resist upward swinging of the front section about its hinge means, and means mounted in connection with and yieldably acting on the rear section with a greater force to resist upward swinging of the rear section about its hinge means.

2. In a grass receiver having a main bottom, a false bottom therein extending rearwardly from the front end of the main bottom, said false bottom comprising front and rear sections, means hinging the sections together at adjacent ends, means hingedly connecting the rear section at its rear end to the main bottom, an arm extending lengthwise of the false bottom and pivoted intermediate its ends on the front section intermediate its ends and terminating at its rear end in contact with the rear section, the portion of said arm in front of its pivot being disposed at an acute upward angle to the front bottom section when the sections lie in alined relation, and a pull element applied to the forward end of said arm.

3. In a grass receiver having a main bottom, a false bottom in the receiver extending rearwardly from adjacent the front end of the main bottom, said false bottom comprising front and rear sections, means hinging the sections together at adjacent ends, means hinging the rear section at its rear end on the main bottom, pull-up means applied to the front section, a stop element mounted on one section and arranged to engage the other section after the front section has been raised to a predetermined angle relative to the rear section whereby to maintain the sections in such angular relation with continued upward movement of the front section.

4. In a grass receiver having a main bottom, a false bottom in the receiver extending rearwardly from adjacent the front end of the main bottom, said false bottom comprising front and rear sections, means hinging the sections together at adjacent ends, means hinging the rear section at its rear end on the main bottom, pull-up means applied to the front section, a longitudinally extending arm mounted on one section for limited pivotal movement in a vertical plane, said arm overlying and engaging the other section whereby after the front section has been raised to a predetermined angle relative to the rear section, the arm reaches its limit of pivotal movement and maintains the sections in such angular relation with continued forward movement of the front section.

WILLIAM P. LOWTHER.